Sept. 13, 1966  N. G. JOHNSON  3,272,010
DEVICE FOR METERING MILK AND OTHER LIQUIDS
Filed Dec. 24, 1963  2 Sheets-Sheet 1

INVENTOR
NOEL GORDON JOHNSON
BY: McGlew and Toren,
ATTORNEYS

Sept. 13, 1966 N. G. JOHNSON 3,272,010
DEVICE FOR METERING MILK AND OTHER LIQUIDS
Filed Dec. 24, 1963 2 Sheets-Sheet 2
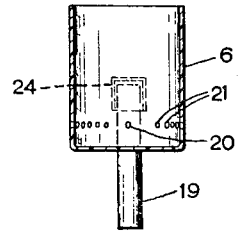
FIG. 5.
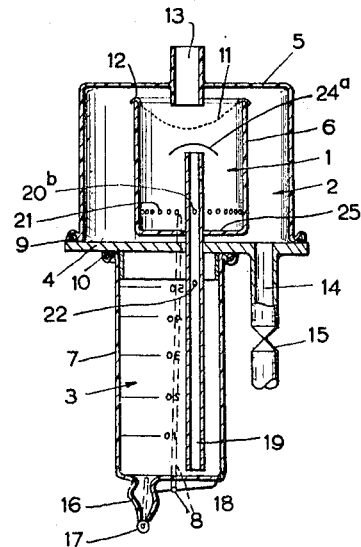
FIG. 6.
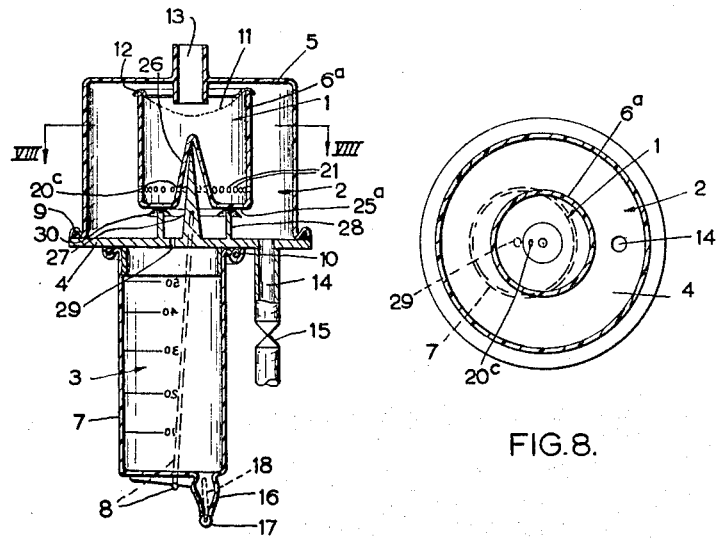
FIG 7
FIG. 8.
INVENTOR
NOEL GORDON JOHNSON
By: Mueslow and Toren,
attorneys

United States Patent Office 3,272,010
Patented Sept. 13, 1966

3,272,010
DEVICE FOR METERING MILK AND OTHER LIQUIDS
Noel G. Johnson, Hairini, near Te Awamutu,
New Zealand
Filed Dec. 24, 1963, Ser. No. 333,051
Claims priority, application New Zealand, Jan. 17, 1963,
133,965
25 Claims. (Cl. 73—202)

The invention relates to devices for metering milk and other liquids, and has for one of its objects the provision of a metering device of novel construction whereby a substantially constant proportion of a total quantity of milk or other liquid passing through the device can be diverted and metered, so that the volume of liquid passing through the device can be ascertained as a function of the volume of the proportion so diverted. In this respect, the device acts as an integrating meter.

A further object of the invention is to provide a device which, besides metering a quantity of milk or other liquid passing therethrough, continuously draws off a portion of the liquid to provide a representative sample of the liquid for testing or other purposes. In this respect, the device acts also as a sampler.

The invention has been devised with particular reference to the milking of cows by machinery, and with the particular object of providing a device whereby the yield of milk from individual cows, or from a group or herd of cows, can be measured with adequate accuracy during the milking of the cow or cows; and whereby, in addition, a representative sample of the milk yielded can be obtained for purposes of testing. The invention is not, however, limited to this application, and it is envisaged that the invention may be of quite general application in measuring the volume of a quantity of liquid flowing through the device, particularly in cases where it is desirable to obtain a representative sample of the flowing liquid for any purpose.

Other particular objects, advantages, and functions of the invention will be apparent from the following description.

The device provided by the invention consists of a composite container structure, including a primary chamber, a secondary chamber, and a metering chamber; a liquid inlet communicating with the primary chamber and through which liquid from outside the device can enter the primary chamber; a liquid outlet communicating with the secondary chamber and through which liquid within the secondary chamber can pass out of the device; liquid outlet means providing a communication between the primary chamber and the secondary chamber, whereby a major proportion of liquid introduced into the primary chamber may pass into the secondary chamber; and additional liquid outlet means providing a communication between the primary chamber and the metering chamber, whereby a minor proportion of liquid introduced into the primary chamber may pass into the metering chamber, the relative capacities of the said outlet means communicating with the secondary chamber and the said outlet means communicating with the metering chamber being substantially fixed, so that, when the device is in use, the outflow of liquid from the primary chamber to the secondary chamber represents a function of the outflow of liquid from the primary chamber to the metering chamber.

The metering chamber may be provided with a liquid outlet whereby liquid collected therein when the device is in use can be drawn off from the metering chamber for measuring and/or testing. The metering chamber may be of transparent material, calibrated with a graduated scale, whereby the volume of liquid passing through the device is indicated as a function of the volume of liquid collected within the metering chamber.

The primary chamber may be disposed within the secondary chamber, or vice versa, depending on the arrangement of the liquid inlet and liquid outlet, and the direction of flow of liquid through the device.

A communication may be provided between the metering chamber and the secondary chamber of the device, in such a way as normally to prevent the outflow of liquid from the secondary chamber into the metering chamber, whilst enabling liquid from the metering chamber to pass into the secondary chamber and thence through the liquid outlet of the device, when that is desired.

Metering devices constituting six different embodiments of the invention are shown in the accompanying drawings, and will now be described with reference to the drawings, by way of example of how the invention can be carried into effect. The embodiments shown in the drawings have all been designed for use in conjunction with vacuum milking machines in ascertaining the yield of milk from cows, and they will be described in relation to that use. It will, however, be understood that no limitation is thereby imposed on other possible applications of the described embodiments in the metering of liquids.

In the drawings:

FIGURE 5 is an elevation of a constructional detail which is common to all of the devices shown in FIGURES 1 to 4;

FIGURES 6 and 7 are sectional elevations, similar to FIGURES 1 to 4, of devices constituting two further embodiments of the invention; and FIGURE 8 is a sectional plan of the device shown in FIGURE 7, this section being taken in the horizontal plane indicated by the line VIII—VIII in FIGURE 7.

Figure 1:
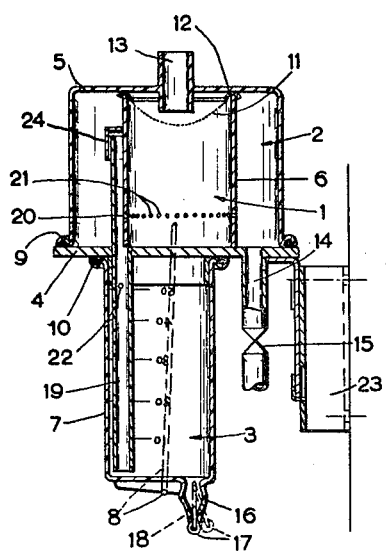
FIGURES 1, 2, 3 and 4 are similar sectional elevations of metering devices constituting four separate embodiments of the invention, the section in each case being taken in the medial plane of the device.

In FIGURES 2, 3, 4, 6 and 7, certain minor constructional details which are shown in FIGURE 1, and are common to all six embodiments of the invention, are omitted for the sake of clarity.

Throughout the drawings, the same reference numerals are used in respect of corresponding or substantially corresponding parts of the different embodiments of the invention.

The embodiment of the invention which is illustrated in FIGURE 1 of the drawings will be first described, in detail, and the other embodiments illustrated in the drawings will then be described insofar as they differ in construction and operation from the first-described embodiment.

In the embodiment illustrated in FIGURE 1 of the drawings, the metering device consists of a composite container structure including a primary chamber 1, a secondary chamber 2, and a metering chamber 3. The primary chamber 1 and secondary chamber 2 are contained within an upper portion of the device, above a horizontal partitioning plate 4, and the metering chamber 3 is contained within a lower portion of the device, below the partitioning plate 4.

The upper portion of the device includes a cylindrical cover 5 having an open lower end which is applied to the upper face of the partitioning plate 4, the primary chamber 1 and secondary chamber 2 being contained within the space enclosed by the cover 5 and the partitioning plate 4. The upper portion of the device also includes an upright cylindrical wall 6, of smaller diameter than the cover 5, the wall 6 being disposed centrally within the cover 5 and being permanently secured at its lower end to the central part of the upper face of the partitioning plate 4, and extending upwardly to the upper end of the cover 5. The space enclosed by the cylindrical wall 6 constitutes the primary chamber 1, whilst the annular space between the wall 6 and the surrounding wall of the cover 5 constitutes the secondary chamber 2.

The metering chamber 3 is contained within a cylindrical receptacle 7 having an open upper end which is applied to the lower face of the partitioning plate 4.

The cover 5 and receptacle 7 are retained in engagement with the partitioning plate 4 by means of a wire stirrup 8 which is pivotally engaged with the lower part of the cover 5 and, at its other end, is sprung into engagement with a recess or indentation in the base of the receptacle 7. The lower rim of the cover 5, and the upper rim of the receptacle 7, are fitted with rubber or similar sealing rings 9 and 10 respectively, whereby an adequately fluid-tight seal is provided between each of the said rims and the corresponding face of the partitioning plate 4.

A wire gauze strainer 11 is provided within the upper end of the primary chamber 1, the rim of the strainer being supported on the upper end of the cylindrical wall 6, and being fitted with a rubber or similar sealing ring 12 whereby an adequately fluid-tight seal is provided between the upper end of the wall 6 and the undersurface of the top of the cover 5.

A liquid inlet 13 is provided in the central part of the top of the cover 5, so that liquid entering the device through the inlet 13 passes into the primary chamber 1 through the strainer 11. A liquid outlet 14 is provided in the partitioning plate 4, in communication with the secondary chamber 2, the outflow of liquid from the secondary chamber 2 through the outlet 14 being controlled by a plug cock 15 in the outlet 14. An outlet 16 is provided in the base of the receptacle 7, in communication with the metering chamber 3, the outflow of liquid from the metering chamber through the outlet 16 being controlled by a valve consisting of a rubber or similar ball 17 carried by a spring wire retainer 18 pivoted to the upper part of the outlet 16, so that the valve can be closed by moving the ball over the outlet orifice of the outlet 16, and opened by moving the ball to one side of the outlet 16.

The metering chamber 3 is in communication with the upper portion of the device through a downpipe 19 which is secured at its upper end portion to the outer surface of the cylindrical wall 6, and extends downwardly through the partitioning plate 4 to near the bottom of the receptacle 7. An approximately semi-circular segment of the upper end portion of the downpipe 19 is cut away where the downpipe is attached to the cylindrical wall 6, so that the remaining semi-circular part of the upper end portion of the downpipe covers a portion of the cylindrical wall 6 of approximately the same width as the diameter of the downpipe 19. The upper end portion of the downpipe 19 extends vertically up the side of the cylindrical wall 6 for about three-quarters of the height of the wall 6, and is open at its upper end so that the downpipe 19 provides a communication between the secondary chamber 2 and the metering chamber 3.

A hole 20 is formed in the lower part of the portion of the cylindrical wall 6 which is covered by the upper end portion of the downpipe 19, so that the primary chamber 1 is in communication with the metering chamber 3 through the hole 20 and downpipe 19. The remaining portion of the cylindrical wall 6 is perforated by a row of holes 21, of the same diameter as the hole 20, and lying in the same horizontal plane as the hole 20. The holes 21 thus constitute liquid outlet means through which liquid entering the primary chamber 1 through the inlet 13 can flow into the secondary chamber 2; whilst the hole 20, in conjunction with the downpipe 19, constitutes additional liquid outlet means, through which a portion of the liquid entering the primary chamber 1 can flow into the metering chamber 3. An air hole 22 is provided in the downpipe 19, just below the partitioning plate 4, so that air within the metering chamber 3 which is displaced by liquid entering that chamber through the downpipe 19 can pass into the secondary chamber 2 through the air hole 22 and the upper part of the downpipe 19.

A bracket 23 is provided whereby the device can be mounted in an upright position on a wall or similar support, the bracket comprising two slidably interfitting portions, one of which is secured to the partitioning plate 4 at one edge thereof and projects downwardly therefrom, whilst the other portion is securable to the said wall or other support.

In its use for the aforementioned purpose, the device is interposed in a milk line of a vacuum milking apparatus, so that the milk flowing along the line passes through the device on its way to the collecting tank of the milking apparatus. The device is connected in the milk line so that the milk enters the device through the inlet 13, and leaves it through the outlet 14, the outlet cock 15 being open. The outlet 16 of the receptacle 7 is closed by the ball 17 in order both to prevent the escape of milk from the receptacle 7, and to maintain the vacuum in the milk line.

The major proportion of the milk which flows into the primary chamber 1 through the inlet 13 passes into the secondary chamber 2 through the row of holes 21 in the lower part of the cylindrical wall 6, and hence passes out of the device through the outlet 14. A minor proportion of the milk, however, passes through the hole 20 and downpipe 19 into the metering chamber 3, and is collected therein as milk continues to flow through the device. The milk so collected represents a substantially fixed proportion of the total amount of milk entering the device through the inlet 13. Thus, for example, if there are forty-nine holes 21, the volume of milk collected in the receptacle 7 will be one fiftieth of the total volume of milk entering through the inlet 13. Alternatively, if there are fifty holes 21, the milk collected in the receptatcle 7 will represent one fiftieth of the volume of milk which has passed through the outlet 14.

To facilitate computation of the desired total amount of milk, the receptatcle 7 is made of a transparent material such as glass or a transparent synthetic resin, and is calibrated with a graduated scale whereby the volume of milk entering the device through the inlet 13 and/or leaving the device through the outlet 14 is indicated as a function of the volume of milk collected within the receptacle 7.

When the total volume has been thus computed, at the cessation of milking, the milk contained within the receptacle 7 may be withdrawn to the collecting tank of the milking apparatus by moving the ball 17 to one side so as to open the receptacle outlet 16, whereupon the vacuum obtaining within the milking system causes the milk within the receptacle 7 to pass upwardly through the downpipe 19 and into the secondary chamber 2, and thence through the outlet 14 to the collecting tank.

Alternatively, when the milk within the receptatcle 7 is desired as a sample for testing purposes, it can be run off for testing by closing the outlet cock 15 and moving the ball 17 to one side of the receptacle outlet 16, whereupon the milk flows by gravity out of the receptatcle 7 through the outlet 16.

The cover 5 will normally be made of a transparent material, similar to that of the receptacle 7, so that an operator may ascertain by inspection whether milk is flowing through the device. If the cover 5 is made of a non-transparent material, such as metal, a transparent window (not shown in the drawings) may be provided in its side for this purpose.

The cylindrical wall 6 may also be made of a transparent material, so that a rough indication of the rate of flow of milk through the device may be obtained by inspection of the level of milk within the primary chamber 1 while the milk is flowing. In this case, the cover 5 is necessarily of a transparent material or provided with a transparent window, as mentioned above.

Figure 2:
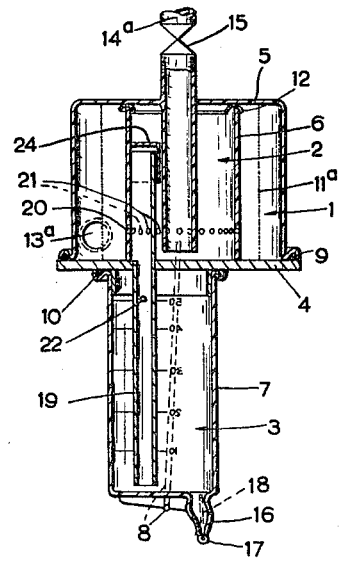

The device constituting the embodiment shown in FIGURE 2 of the drawings differs from that shown in FIGURE 1 in that the direction of flow of milk through the device when it is in use is reversed, the milk entering through an inlet 13a in the side of the cover 5, near the lower edge thereof, and leaving through a vertical outlet tube 14a which is open at its lower end and extends upwardly through the central part of the top of the cover 5, from a point below the level of the row of holes 21. The primary and secondary chambers are reversed, the primary chamber 1 comprising the space between the cylindrical wall 6 and the surrounding wall of the cover 5, whilst the secondary chamber 2 comprises the space enclosed by the cylindrical wall 6. The downpipe 19 extends downwardly from the secondary chamber 2, its upper end portion being secured to the inner surface of the cylindrical wall 6. The strainer 11 of the device shown in FIGURE 1 is replaced by a vertical cylindrical strainer 11a extending from top to bottom of the primary chamber 1 and surrounding the cylindrical wall 6. A liquid-tight seal is provided between the upper rim of the wall 6 and the top of the cover 5.

To ensure a substantially equal flow of milk through each of the holes 20 and 21, the inlet 13a is disposed tangentially to the vertical cylindrical wall of the cover 5, so that milk from the milk line in which the device is connected flows tangentially into the primary chamber 1, and swirls centrifugally around the primary chamber. In this way, a substantially even head of milk is produced at each of the holes 20 and 21.

The device constituting the embodiment shown in FIGURE 3 differs from the device shown in FIGURE 1 in that no fluid-tight seal is provided between the upper end of the cylindrical wall 6 and the top of the cover 5, the upper end of the wall 6 being disposed some distance below the top of the cover 5. Thus the flow of milk from the primary chamber 1 through the holes 20 and 21 is substantially by gravity. This form of the device has the practical advantage that the strainer 11 may be cleaned without dismantling the device, as a strong flow of washing water through the inlet 13 onto the strainer 11 will cause any particles of foreign matter trapped by the strainer to be washed over the rim of the strainer into the secondary chamber 2, and carried away through the outlet 14.

Figure 3:
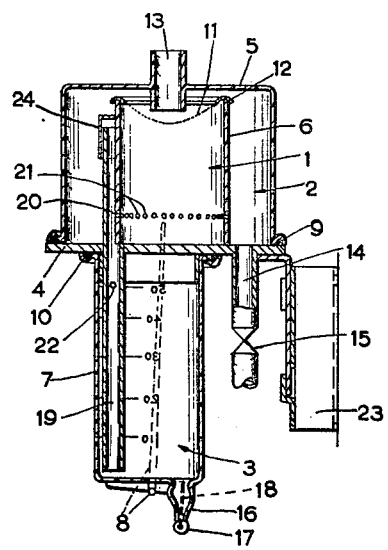

Despite this advantage, however, the device shown in FIGURE 3 is not in general considered to be as efficient as the device shown in FIGURE 1, in which the flow of milk through the holes 20 and 21 is aided by the vacuum existing within the milking system, so that any small particles of foreign matter which may pass the strainer 11 tend to be drawn through the holes 20 and 21, with consequent reduction of the risk of blockage of those holes.

The device constituting the embodiment shown in FIGURE 4 of the drawings differs from the device shown in FIGURE 1 in that the downpipe 19 is extended further up the side of the cylindrical wall 6, and the arrangement of holes 20 and 21 is duplicated by holes 20a and 21a respectively higher up the wall 6, in a horizontal plane lying just below the level of the upper end of the downpipe 19. By this means, when froth accumulates on milk within the primary chamber 1 and rises to the level of the holes 20a and 21a, the froth passes through those holes into the metering chamber 3 and secondary chamber 2 respectively, in the same proportions as the milk passing through the holes 20 and 21. At the same time, the accumulation of froth within the primary chamber 1 is kept in check.

In all of the devices shown in FIGURES 1 to 4 of the drawings, the hole 20, communicating with the downpipe 19, is separated from each of the two immediately adjacent holes 21 by a space which is greater than the space between any other two adjacent ones of the holes 21. This arrangement is indicated semi-diagramatically in FIGURE 5 of the drawings, and is adopted for the purpose of minimising the effect of surface tension, caused by the proximity of the downpipe 19, which might otherwise result in the flow of milk through the hole 20, and also through each of the two immediately adjacent holes 21, being greater than the flow of milk through any one of the remaining holes 21.

Additionally, in all of the devices shown in FIGURES 1 to 4 of the drawings, a semi-cylindrical baffle 24, of greater diameter than the downpipe 19 and open at its upper and lower ends, is provided around the open upper end of the downpipe 19. The baffle 24 substantially prevents splashes of milk within the secondary chamber 2 from entering the open upper end of the downpipe 19, whilst allowing milk from the metering chamber 3 to pass out of the open upper end of the downpipe 19, into the secondary chamber 2, when the metering chamber 3 is emptied by vacuum in the manner hereinbefore described.

The device constituting the embodiment shown in FIGURE 6 differs from the device shown in FIGURE 1 in that the upper end part of the vertical downpipe 19 is disposed centrally within the primary chamber 1, the downpipe being cylindrical throughout its length. The row of holes 21 continues uninterruptedly around the circumference of the cylindrical wall 6, and the hole 20 of the device shown in FIGURE 1 is replaced by a hole 20b in the upper end part of the downpipe 19, the hole 20b being of the same size and in the same horizontal plane as the holes 21. A baffle 24a is supported above the upper end of the downpipe 19, so that milk entering the primary chamber 1 through the inlet 13 is prevented by the baffle 24 from flowing directly into the downpipe 19 through the open upper end of the downpipe.

The device shown in FIGURE 6 also differs from the device shown in FIGURE 1 in that, as in the device shown in FIGURE 3, no fluid-tight seal is provided between the upper end of the cylindrical wall 6 and the top of the cover 5.

Although the device shown in FIGURE 6 is somewhat simpler to manufacture than the device shown in FIGURE 1, it is not considered to be as efficient in operation, in most cases, as is the device shown in FIGURE 1.

Figure 4:
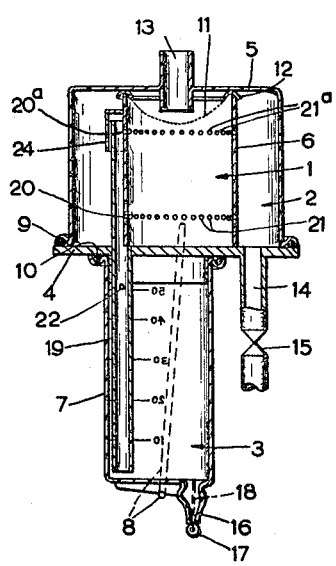

The devices shown in FIGURES 4 and 6 also differ from the device shown in FIGURE 1 in that the lower end of the cylindrical wall 6 is not secured directly and in a liquid-tight manner to the upper surface of the partitioning plate 4, but is closed by means of a bottom wall 25, so that the cylindrical wall 6 and the bottom wall 25 together form a can-like container within which the primary chamber 1 is contained. This container is supported by its securement to the upper end portion of the downpipe 19, with its bottom wall 25 some distance above the upper surface of the partitioning plate 4. Thus, milk within the secondary chamber 2 may flow beneath as well as around the said container.

The device constituting the embodiment shown in FIGURES 7 and 8 of the drawings differs from the device shown in FIGURE 1 of the drawings in that the primary chamber 1 is contained within a self-balancing can comprising a vertical cylindrical side wall 6a and a bottom wall 25a formed with a centrally disposed and upwardly directed conical indentation 26. The indentation 26 extends to a point above the centre of gravity of the can, and the can is supported at the apex of its indentation 26, on the pointed upper end of a conical projection 27 which extends upwardly from the central part of the partitioning plate 4.

The upper surface of the partitioning plate 4 is also formed with an upstanding vertical annular flange 28 which surrounds the lower part of the projection 27, and encloses an annular portion of the flat surface of the partitioning plate 4 between the flange 28 and the base of the projection 27. This annular portion of the plate 4 is pierced by a hole 29, communicating with the metering chamber 3.

The row of holes 21 through which milk flows from the primary chamber 1 to the secondary chamber 2 extends completely around the circumference of the cylindrical wall 6a of the can containing the primary chamber 1. A single hole 20c, of the same size and in the same plane as the holes 21, is formed in the conical indentation 26 of the bottom wall 25a, so that liquid within the primary chamber 1 can flow through the hole 20c into the annular space between the flange 28 and projection 27, and thence through the hole 29 into the metering chamber 3.

To prevent milk which has flowed through the hole 20c from clinging by surface tension to the bottom of the can and flowing along the bottom wall 25a to the outer edge thereof, beyond the space between the flange 28 and projection 27, an annular baffle 30, in the form of a torus, is secured to the undersurface of the bottom wall 25a, above the upper end of the flange 28.

In the device shown in FIGURE 7, as in the devices shown in FIGURES 3 and 6, no fluid-tight seal is provided between the upper end of the cylindrical wall 6a (corresponding to the wall 6 in FIGURES 3 and 6) and the top of the cover 5, as the provision of such a seal would obviously prevent the self-balancing of the can in a vertical position.

The device shown in FIGURE 7 possesses the advantage that the self-balancing of the can containing the primary chamber 1 ensures that the outflow of milk from the primary chamber 1 through the hole 20c remains in substantially the same proportion to the outflow of milk from the primary chamber 1 to the secondary chamber 2 through the holes 21, despite any slight inclination of the rest of the device from the vertical position. If the devices constituting the other embodiments of the invention, inclination of the device from the vertical produces a corresponding inclination of the axis of the primary chamber 1, and may result in a slight variations in the proportion of milk which flows from the primary chamber 1 into the metering chamber 3.

It will be obvious that the invention may be embodied in other forms than those illustrated in the drawings, and that various modifications may be made in the embodiments therein illustrated. For example, the holes through which milk passes from the primary chamber 1 to the secondary chamber 2 and metering chamber 3 may be in the form of slots or squares, and more than one hole may be provided for the passage of milk from the primary chamber 1 to the metering chamber 3. It is not essential that the hole or holes through which milk passes from the primary chamber 1 to the metering chamber 3 is or are of the same size as the holes through which milk passes from the primary chamber 1 to the secondary chamber 2.

Other constructional modifications may be made in the method of securement of the cover 5 and receptacle 7 to the partitioning plate 4, and in the arrangement of the liquid inlet and liquid outlet of the device, and of the outlet 16 of the receptacle 7, as well as in the means whereby the flow of liquid therethrough is controlled.

In general, the invention is not limited to the constructional details of the embodiments hereinbefore described with reference to the accompanying drawings, but includes all other embodiments of the invention that fall within the scope of the accompanying claims.

I claim:

1. A device for metering milk and other liquids comprising a composite container structure, including a primary chamber, a secondary chamber, and a metering chamber; a liquid inlet communicating with the primary chamber and through which liquid from outside the device can enter the primary chamber; a liquid outlet communicating with the secondary chamber and through which liquid within the secondary chamber can pass out of the device; liquid outlet means providing a communication between the primary chamber and the secondary chamber, whereby a major proportion of liquid introduced into the primary chamber may pass into the secondary chamber; and additional liquid outlet means providing a communication between the primary chamber and the metering chamber, whereby a minor proportion of liquid introduced into the primary chamber may pass into the metering chamber, the relative capacities of the said outlet means communicating with the secondary chamber and the said outlet means communicating with the metering chamber being substantially fixed, so that, when the device is in use, the outflow of liquid from the primary chamber to the secondary chamber represents a function of the outflow of liquid from the primary chamber to the metering chamber, said primary chamber and the secondary chamber being contained within an upper portion of the container structure, said metering chamber being contained within a lower portion of the said structure; said primary chamber being separated from the secondary chamber by a vertical cylindrical wall provided with a plurality of horizontally aligned apertures which constitute the said liquid outlet means providing a communication between the primary chamber and the secondary chamber.

2. A device according to claim 1, and wherein the said liquid outlet means providing a communication between the primary chamber and the metering chamber consists of an additional aperture provided in the said wall, in horizontal alignment with the other said apertures, and a downpipe extending from within the secondary chamber to the metering chamber; the upper portion of the downpipe, within the secondary chamber, being secured to the said wall and being in communication with the said additional aperture.

3. A device according to claim 1, and wherein the said liquid outlet means providing a communication between the primary chamber and the metering chamber consists of a downpipe extending from within the primary chamber to the metering chamber, the downpipe being in communication with the primary chamber through an aperture provided in the upper portion of the downpipe, the said aperture being disposed in the same horizontal plane as the apertures in the said wall.

4. A device according to claim 1, and wherein the container structure includes a horizontal partitioning plate disposed between the upper and lower portions of the said structure, the upper portion extending upwardly from the upper face of the said plate, and the lower portion extending downwardly from the lower face of the said plate.

5. A device according to claim 4, and wherein the upper portion of the container structure includes a cylindrical cover having an open lower end which is applied to the upper face of the partitioning plate, the primary and secondary chambers being contained within the space enclosed between the said cover and the partitioning plate; whilst the lower portion of the container structure includes a cylindrical receptacle having an open upper end which is applied to the lower face of the partitioning plate, the metering chamber being contained within the space enclosed by the said receptacle and the partitioning plate; the device including retaining means whereby the said cover and receptacle are retained in engagement with the partitioning plate, and sealing means whereby a fluid-tight seal is provided between the lower rim of the cover and the upper face of the partitioning plate, and between the upper rim of the receptacle and the lower face of the partitioning plate.

6. A device according to claim 5, and wherein the upper portion of the container structure includes a can within the space enclosed by the cover and the partitioning plate, the can containing the primary chamber and comprising the said vertical cylindrical wall and a bottom wall formed with a centrally disposed and upwardly directed conical indentation which extends to a point above the centre of gravity of the can; and wherein the partitioning plate is provided on its upper face with a centrally disposed and upwardly directed conical projection, the can being supported at the apex of its indentation on the apex of the said projection.

7. A device according to claim 6, and wherein the partitioning plate is provided on its upper face with an upstanding vertical annular flange surrounding the lower part of the said conical projection, and enclosing a flat annular portion of the upper surface of the partitioning plate between the said flange and the base of the said projection; and wherein the said annular portion is pierced by a hole communicating with the metering chamber; and wherein an aperture is formed in the conical indentation of the can, in the same horizontal plane as the said apertures in the cylindrical wall; a baffle being provided on the base of the can whereby liquid issuing from the primary chamber through the said aperture in the conical projection of the can is directed into the annular space between the said flange and the conical projection of the partitioning plate, so that the liquid flows into the metering chamber through the hole in the said annular portion of the partitioning plate.

8. A device according to claim 2, wherein a communication is provided between the metering chamber and the secondary chamber, through which liquid within the metering chamber can pass into the secondary chamber and thence through the said liquid outlet, the said communication being such as normally to prevent the outflow of liquid from the secondary chamber into the metering chamber.

9. A device according to claim 8, wherein the downpipe extends to near the bottom of the metering chamber, and wherein the upper end of the downpipe is open to the secondary chamber and is disposed above the level of the said aperture through which the primary chamber communicates with the downpipe, so that the downpipe, through its open upper end, constitutes the said communication between the metering chamber and the secondary chamber.

10. A device for metering milk and other liquids, comprising a composite container structure, including a primary chamber, a secondary chamber, and a metering chamber; a liquid inlet communicating with the primary chamber and through which liquid from outside the device can enter the primary chamber; a liquid outlet communicating with the secondary chamber and through which liquid within the secondary chamber can pass out of the device; liquid outlet means providing a communication between the primary chamber and the secondary chamber, whereby a major proportion of liquid introduced into the primary chamber may pass into the secondary chamber; and additional liquid outlet means providing a communication between the primary chamber and the metering chamber, whereby a minor proportion of liquid introduced into the primary chamber may pass into the metering chamber, the relative capacities of the said outlet means communicating with the secondary chamber and the said outlet means communicating with the metering chamber being substantially fixed, so that, when the device is in use, the outflow of liquid from the primary chamber to the secondary chamber represents a function of the outflow of liquid from the primary chamber to the metering chamber, said primary chamber and the secondary chamber being contained within an upper portion of the container structure, said metering chamber being contained within a lower portion of the said structure; said primary chamber being separated from the secondary chamber by a vertical cylindrical wall provided with a plurality of horizontally aligned apertures which constitute the said liquid outlet means providing a communication between the primary chamber and the secondary chamber, and wherein the said liquid outlet means providing a communication between the primary chamber and the metering chamber consists of a downpipe extending from within the primary chamber to the metering chamber, the downpipe being in communication with the primary chamber through an aperture provided in the upper portion of the downpipe, the said aperture being disposed in the same horizontal plane as the apertures in the said wall, wherein a communication is provided between the metering chamber and the secondary chamber, through which liquid within the metering chamber can pass into the secondary chamber and thence through the said liquid outlet, the said communication being such as normally to prevent the outflow of liquid from the secondary chamber into the metering chamber, said downpipe extending to near the bottom of the metering chamber, and wherein the upper end of the downpipe is open to the primary chamber and is disposed above the said aperture in the downpipe, the said communication between the metering chamber and the secondary chamber being provided by the downpipe, through its open upper end, and by the said apertures in the vertical wall, whereby liquid issuing into the primary chamber from the open upper end of the downpipe can pass into the secondary chamber.

11. A device according to claim 9, and wherein an air hole is provided in the upper part of that portion of the downpipe which is within the metering chamber, whereby air displaced by liquid entering the metering chamber can pass into the upper portion of the device through the air hole and the open upper end of the downpipe.

12. A device according to claim 2, and wherein a baffle is provided adjacent to the upper end of the downpipe, whereby liquid within the upper portion of the device is inhibited from entering the upper end of the downpipe.

13. A device according to claim 1, and wherein the metering chamber is provided with a liquid outlet controlled by a valve, whereby liquid collected within the metering chamber can be drawn off directly therefrom.

14. A device according to claim 1, and wherein the metering chamber is of transparent material, and is calibrated with a graduated scale, whereby the volume of liquid passing through the device is indicated as a function of the volume of liquid collected within the metering chamber.

15. A device according to claim 5, and wherein the said vertical cylindrical wall is disposed centrally within the cover so as to provide an annular space between the said wall and the surrounding wall of the cover, and is permanently secured at its lower end to the central part of the upper face of the partitioning plate.

16. A device according to claim 15, and wherein the space enclosed by the said cylindrical wall constitutes the primary chamber, whilst the said annular space constitutes the secondary chamber; and wherein the said liquid inlet is provided in the central part of the top of the cover, whilst the said liquid outlet is provided in the partitioning plate and communicates with the said annular space.

17. A device according to claim 15, and wherein the primary chamber comprises the said annular space, whilst the secondary chamber comprises the space enclosed by the said cylindrical wall; and wherein the said liquid inlet is provided in the lower part of the wall of the cover and is disposed tangentially to the wall of the cover, whilst the said liquid outlet consists of a vertical tube which is open at its lower end and extends upwardly through the central part of the top of the cover, the lower end of the said tube being disposed within the secondary chamber below the level of the said apertures in the cylindrical wall.

18. A device according to claim 15, and wherein a fluid-tight seal is provided between the upper rim of the said cylindrical wall and the undersurface of the top of the cover.

19. A device according to claim 1, and wherein a strainer is provided within the primary chamber, whereby liquid entering the primary chamber passes through the strainer before passing from the primary chamber to the secondary chamber.

20. A device according to claim 2, and wherein the said apertures in the vertical cylindrical wall are formed in the lower portion of the wall, and are duplicated by correspondingly arranged apertures in the upper part of the said wall, the downpipe extending to above the level of the upper apertures, and being in communication with the primary chamber through one of the upper apertures.

21. A device according to claim 2, and wherein the said aperture communicating with the downpipe is separated from each of the two immediately adjacent ones of the said apertures communicating with the secondary chamber by a space which is greater than the space between any other two adjacent ones of the last-mentioned apertures.

22. A device according to claim 5, and wherein the cover is of a transparent material.

23. A device according to claim 22, and wherein the vertical cylindrical wall is of a transparent material.

24. A device according to claim 2, and wherein the said apertures communicating with the secondary chamber and the said additional aperture communicating with the downpipe are each of the same size.

25. A device according to claim 1, and including a bracket whereby the device can be mounted in a vertical position on a wall or other fixed support.

References Cited by the Examiner
UNITED STATES PATENTS

| | | | |
|---|---|---|---|
| 2,625,041 | 1/1953 | Hein | 73—202 |
| 3,088,316 | 5/1963 | Hutchings | 73—223 |
| 3,102,424 | 9/1963 | Basham et al. | 73—202 |
| 3,174,345 | 3/1965 | Bodmin | 73—202 X |
| 3,203,239 | 8/1965 | Yandell | 73—202 |

RICHARD C. QUEISSER, *Primary Examiner.*

EDWARD D. GILHOOLY, *Assistant Examiner.*